US009969252B2

(12) United States Patent
Engblom

(10) Patent No.: US 9,969,252 B2

(45) Date of Patent: May 15, 2018

(54) ELECTRIC DRIVE DEVICE FOR DRIVING A MOTOR VEHICLE

(71) Applicant: BAE Systems Hägglunds Aktiebolag, Örnsköldsvik (SE)

(72) Inventor: Daniel Engblom, Bonässund (SE)

(73) Assignee: BAE Systems Hägglunds Aktriebolag, Örnsköldsvik (SE)

(*) Notice: Subject to any disclaimer, the term of this patent is extended or adjusted under 35 U.S.C. 154(b) by 351 days.

(21) Appl. No.: 14/894,261

(22) PCT Filed: May 27, 2014

(86) PCT No.: PCT/SE2014/050646

§ 371 (c)(1),
(2) Date: Nov. 25, 2015

(87) PCT Pub. No.: WO2014/193297

PCT Pub. Date: Dec. 4, 2014

(65) Prior Publication Data

US 2016/0137044 A1 May 19, 2016

(30) Foreign Application Priority Data

May 30, 2013 (SE) ...................................... 1350658

(51) Int. Cl.
*B60K 1/00* (2006.01)
*B60G 9/02* (2006.01)
(Continued)

(52) U.S. Cl.
CPC .................. *B60K 1/00* (2013.01); *B60G 9/02* (2013.01); *H02K 5/00* (2013.01); *H02K 7/003* (2013.01);
(Continued)

(58) Field of Classification Search
CPC ... B60K 1/00; B60K 1/02; B60K 1/04; B60K 2001/001; B60K 2001/003;
(Continued)

(56) References Cited

U.S. PATENT DOCUMENTS 4,667,763 A * 5/1987 Nembach ............... B60K 23/08 180/243
5,308,216 A * 5/1994 Herolf .................. A01G 23/006 180/209
(Continued)

FOREIGN PATENT DOCUMENTS

CH 177793 A 6/1935
DE 102009002440 A1 10/2010
(Continued)

OTHER PUBLICATIONS

International Preliminary Report on Patentability received for PCT Patent Application No. PCT/SE2014/050646, dated Dec. 10, 2015, 6 pages.

(Continued)

*Primary Examiner* — James M Dolak
(74) *Attorney, Agent, or Firm* — Morrison & Foerster LLP

(57) ABSTRACT

The present invention relates to an electrical drive arrangement for driving a motor vehicle comprising an electric motor, a drive shaft driven by means of the electric motor, a housing in which the electric motor is accommodated, which housing has an envelope surface and a substantially annular cross section wherein the horizontal direction of the envelope surface of said housing and hereby said drive shaft are arranged to run substantially transverse to the longitudinal direction of said vehicle, comprising a pendulum suspension for suspension of the electrical drive arrangement, where the pendulum suspension comprises a fastening configuration fixedly connected to the vehicle and at least
(Continued)

one pendulum attachment fixedly connected to the envelope surface of the housing and pivotally journaled relative to said fastening configuration by means of a bearing configuration. The invention also relates to a motor vehicle.

15 Claims, 5 Drawing Sheets

(51) Int. Cl.
*H02K 5/00* (2006.01)
*H02K 7/00* (2006.01)
*B60K 11/02* (2006.01)

(52) U.S. Cl.
CPC .... *B60G 2200/322* (2013.01); *B60G 2300/50* (2013.01); *B60K 11/02* (2013.01); *B60K 2001/001* (2013.01); *B60K 2001/006* (2013.01); *B60Y 2200/41* (2013.01); *B60Y 2306/03* (2013.01)

(58) Field of Classification Search
CPC ........ B60K 2001/006; B60P 3/00; B60P 3/06; B60R 16/00; B60R 16/0215; B60R 16/02; B60R 16/03; B60R 16/08; B60L 11/00; B60L 2200/40
See application file for complete search history.

(56) References Cited

U.S. PATENT DOCUMENTS 5,947,226 A * 9/1999 Bellamy .............. B60K 5/1208 180/299
5,971,413 A * 10/1999 El-Kassouf ........... B60B 35/006 180/360
7,115,057 B2 * 10/2006 House .................... B60K 6/365 180/65.25
7,669,865 B2 * 3/2010 Mollhagen ............... B60G 3/14 280/124.112
8,684,125 B2 * 4/2014 Niva ........................ B60K 6/46 180/235
8,991,547 B2 * 3/2015 Karlsson .................. B60K 1/00 180/243
9,071,087 B2 * 6/2015 Karlsson .............. B60K 7/0007
9,158,868 B2 * 10/2015 Jomaa ..................... G06F 17/50
9,219,393 B2 * 12/2015 Karlsson .................. B60K 1/00
9,376,008 B2 * 6/2016 Abe ....................... B60K 17/04
2012/0283061 A1 11/2012 Karlsson et al.

FOREIGN PATENT DOCUMENTS

FR 791623 A 12/1935
GB 445442 A 4/1936
WO 2011/087426 A1 7/2011
WO 2012/008911 A1 1/2012

OTHER PUBLICATIONS

International Written Opinion received for PCT Patent Application No. PCT/SE2014/050646, dated Sep. 11, 2014, 4 pages.
Extended European Search Report (includes Supplementary European Search Report and European Search Opinion) received for European Patent Application No. 14804012.4, dated Jan. 17, 2017, 5 pages.
International Search Report received for PCT Patent Application No. PCT/SE2014/050646, dated Sep. 11, 2014, 4 pages.

* cited by examiner

ELECTRIC DRIVE DEVICE FOR DRIVING A MOTOR VEHICLE

CROSS REFERENCE TO RELATED APPLICATION

This application is a U.S. National Stage patent application of PCT/SE2014/050646, filed on May 27, 2014, which claims priority to Swedish Patent Application No. 1350658-9, filed on May 30, 2013, the entire contents of which are incorporated herein by reference.

FIELD OF THE INVENTION

The invention relates to an electrical drive arrangement. The invention also relates to a motor vehicle.

BACKGROUND OF THE INVENTION

The automotive industry is undergoing a period of change where the vehicles are electrified to a greater extension, where a trend is hybridization of different degree. There are high demands for compactness and high power and torque output.

Further, for work vehicles and military vehicles the manoeuvrability of the vehicle is important.

WO2012066035 discloses an electric shaft of a motor vehicle comprising an electric motor for propulsion of the vehicle arranged coaxially on said shaft and hence transverse to the longitudinal extension of the vehicle. The electric shaft has transmission configurations on each side of the electric motor. Such an electrical shaft enables a compact and volume-efficient construction.

SUMMARY OF THE INVENTION

An object of the present invention is to obtain an electrical drive arrangement for driving a motor vehicle with a compact and volume-efficient design that enables improved manoeuvrability of the motor vehicle.

These and other objects, which will become apparent from the following description, are obtained by means of an electrical drive arrangement as well as a motor vehicle of the initially mentioned kind and that further exhibit the features indicated below. Preferred embodiments of the electrical drive arrangement are defined below.

According to the invention, the objects are obtained by an electrical drive arrangement for driving a motor vehicle comprising an electric motor, a drive shaft driven by means of the electric motor, a housing in which the electric motor is accommodated, which housing has an envelope surface and a substantially annular cross section wherein the horizontal direction of the envelope surface of said housing and hereby said drive shaft are arranged to run substantially transverse to the longitudinal direction of said vehicle, comprising a pendulum suspension for suspension of the electrical drive arrangement, where the pendulum suspension comprises a fastening configuration fixedly connected to the vehicle and at least one pendulum attachment fixedly connected to the envelope surface of the housing and pivotally journaled relative to said fastening configuration by means of a bearing configuration. This enables improved mobility of the vehicle, by a compact, volume-efficient design of the electrical drive arrangement.

In an embodiment of the electrical drive arrangement, the electric motor has a stator and a rotor arranged to rotate the drive shaft.

In an embodiment of the electrical drive arrangement, said drive shaft is arranged for driving two output shafts for driving ground engaging means, preferably via suitable transmission configurations and wherein said output shafts are arranged to run substantially transverse to the longitudinal direction of said vehicle.

In an embodiment of the electrical drive arrangement, said fastening configuration is arranged for suspension of a front and a rear pendulum attachment. This results in a stable suspension of the electrical drive shaft arrangement.

In an embodiment of the electrical drive arrangement, said bearing configuration comprises slide bearing. The advantage of using slide bearing is that it is space saving for the pendulum suspended drive shaft.

In an embodiment of the electrical drive arrangement, said slide bearing comprises an outer bearing part fixedly connected to said fastening configuration and an inner bearing part fixedly connected to said pendulum attachment and internally and slidable relative to said outer bearing part. This provides a compact and efficient pendulum suspension for the electrical drive arrangement.

In an embodiment of the electrical drive arrangement, said pendulum attachment is connected to a connection unit attached at the envelope surface of said housing for medium supply of the electric motor, wherein said medium supply is arranged to take place via an opening in the envelope surface of said housing. Thus, by arranging the connection unit adjacent to the pendulum attachment, the relative motion of the connection unit affected becomes relative to the vehicle body during pendulum of the electrical drive arrangement and where connected cables and lines relatively small which makes it easier to clutch cabling and lines to the vehicle body such as vehicle frame/chassis. Hence, this enables minimizing of the movement of the connection unit during rotation of the pendulum attachment relatively the fastening configuration wherein for instance cabling clutched to the connection unit and attached to fixed part of the vehicle is not significantly affected/pivoted during said rotation. Further, this enables, by medium supplying the electric motor via the connection unit in the form of energy supply from power electronics, providing of an axially compact electrical drive arrangement where the electrical drive arrangement comprises transmission configuration arranged on respective side of the electric motor since no cabling needs to be connected/disconnected on any of the sides of the electric motor to free up space at the ends for compact connection of the transmission configuration. The transmission configuration may be constituted by planetary gear/reduction gear. Further, by medium supplying the electric motor via the connection unit in the form of coolant and lubricant and, where proper, transmission configurations in the form of planetary gears/reduction gears, simple and efficient cooling and lubrication of the electrical drive arrangement, and hence efficient operation, is enabled. By being able to connect both the cabling for electric energy, lines for lubricant and coolant, and cabling for signal connection at the same place, the laying of the cabling/lines, and clutching of the same, is facilitated.

In an embodiment of the electrical drive arrangement, said connection unit is connected to said pendulum attachment inside the inner bearing part of said slide bearing. This minimizes the movement of the connection unit during rotation of the pendulum attachment relatively the fastening configuration wherein for instance cabling connected at the connection unit and clutched to fixed part of the vehicle is not affected/pivoted significantly during said rotation.

In an embodiment of the electrical drive arrangement, said pendulum attachment is arranged between uppermost and lowermost portions of the envelope surface of said housing. Hereby, the ground clearance of the vehicle or the height of the vehicle is not affected by the pendulum attachment, wherein such an embodiment of the electrical drive arrangement is well suited for, for instance, mining vehicles that move in confined spaces.

In an embodiment of the electrical drive arrangement, said pendulum attachment axially is arranged substantially adjacent to a central portion of the envelope surface of said housing. This results in a stable pendulum suspension. By having the connection unit connected to said pendulum attachment thus arranged inside the inner bearing part of said slide bearing, the replacement of conventional mechanical drive train with electrical drive arrangement is facilitated, according the present invention, where space centrally of the vehicle is freed, where a propeller shaft centrally arranged of the conventional drive train has been taking up space, wherein cabling can be led centrally in the longitudinal extension for connection to the generator.

In an embodiment of the electrical drive arrangement, the pendulum attachment circumferentially of the envelope surface of the housing is located adjacent to a horizontal centre plane of the envelope surface of the housing. This results in a stable pendulum suspension.

In an embodiment of the electrical drive arrangement, said medium supply comprises energy supply by means of power electronics and/or coolant and lubricant supply.

In an embodiment of the electrical drive arrangement, an oil sump is arranged at the bottom of the housing in a desired space formed between the electric motor and said housing under a lowermost portion of the envelope surface of the electric motor, for said coolant and lubricant supply. This enables for efficient lubrication of gears/cogwheels and uptaking of oil coolant for cooling the electric motor.

In an embodiment of the electrical drive arrangement, the electric motor is eccentrically arranged in the housing such that the centre of rotation of the drive shaft of the electric motor runs substantially parallel to and spaced from an imaginary centre axis of the housing to form said desired space. This enables a compact, volume-efficient and stable arrangement while space is freed for, for instance, oil sump and/or differential/differential shaft in the housing. Further, gathering of connections for medium supply comprising coolant and lubricant to the oil sump via the connection unit, as well as outtake of cabling via the connection unit out of the housing, is facilitated.

In an embodiment, the electrical drive arrangement further comprises a differential device having a shaft configuration arranged in the housing in the desired space between the electric motor and the housing. This results in a compact solution with differential device for differential function, which differential device is connected to planetary gears, wherein effective operation is enabled.

BRIEF DESCRIPTION OF THE DRAWINGS

The present invention will be better understood by reference to the following detailed description read together with the accompanying drawings, wherein equal reference numerals refer to the same parts throughout the several views, and in which.

DETAILED DESCRIPTION OF THE INVENTION

Figure 1:
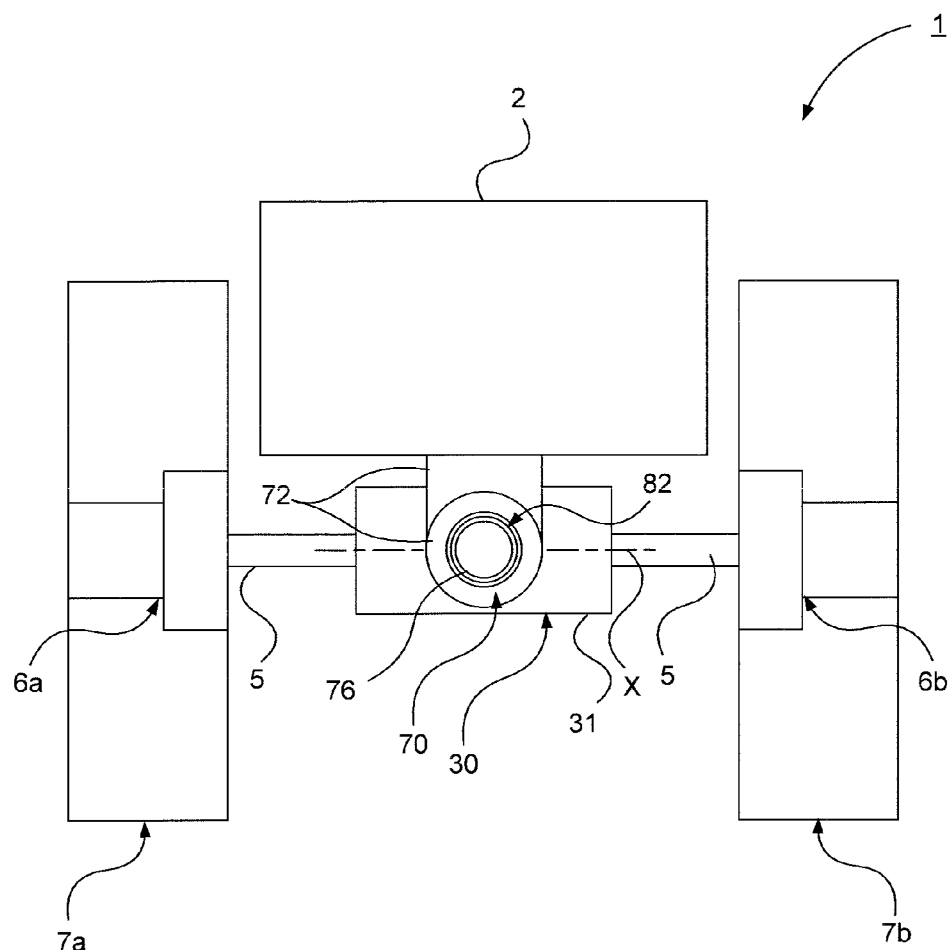
FIG. 1 schematically illustrates a motor vehicle with an electrical drive arrangement I according to an embodiment of the present invention.

FIG. 1 schematically illustrates a motor vehicle 1 according to an embodiment of the present invention. The exemplified vehicle 1 is constituted by a heavy vehicle in the form of a work vehicle such as a mining vehicle. In an alternative variant, the vehicle is constituted by a military vehicle. In a variant, the motor vehicle is constituted by an articulated vehicle. The motor vehicle 1 comprises an electrical drive arrangement I according to any of the embodiments of the present invention. The motor vehicle 1 is intended to be propelled by means of the drive arrangement. The motor vehicle 1 comprises a vehicle body 2 comprising a vehicle frame.

The electrical drive arrangement I is arranged to drive output shafts 5. Hub means 6*a*, 6*b* are arranged at the end of the respective output shaft 5. In a variant, hub means 6*a*, 6*b* are constituted by hub reductions 6*a*, 6*b*. In an alternative variant, the hub means are constituted by drive wheels for tracked vehicles, which in a variant comprise hub reduction gears. Ground engaging means 7*a*, 7*b* are arranged at the respective hub reduction 6*a*, 6*b* for propulsion of the vehicle 1. In a variant, the ground engaging means 7*a*, 7*b* are constituted by wheels. In an alternative variant, the ground engaging means 7*a*, 7*b* are constituted by tracks.

Said output shafts 5 are arranged to run substantially transverse to the longitudinal direction of the vehicle 1 intended to be driven by means of the electrical drive arrangement I.

Figure 4:
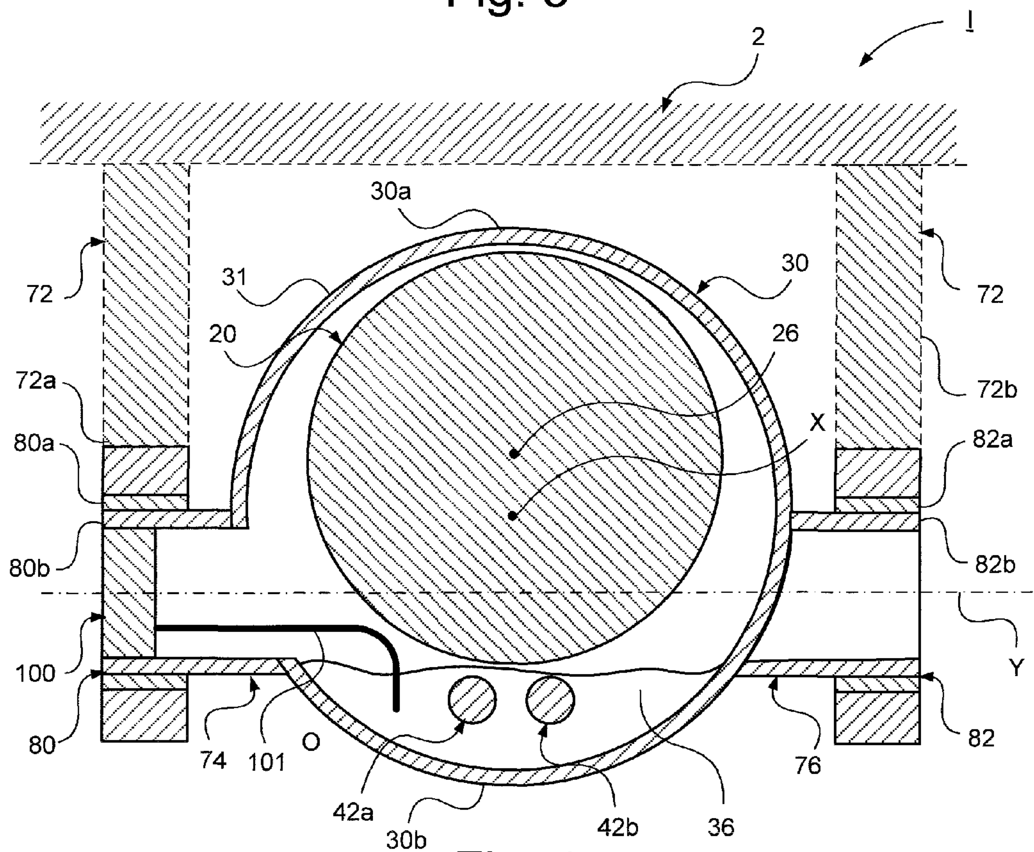
FIG. 4 schematically shows a radial cross sectional view of the electrical drive arrangement I of FIG. 3.
Figure 7A:
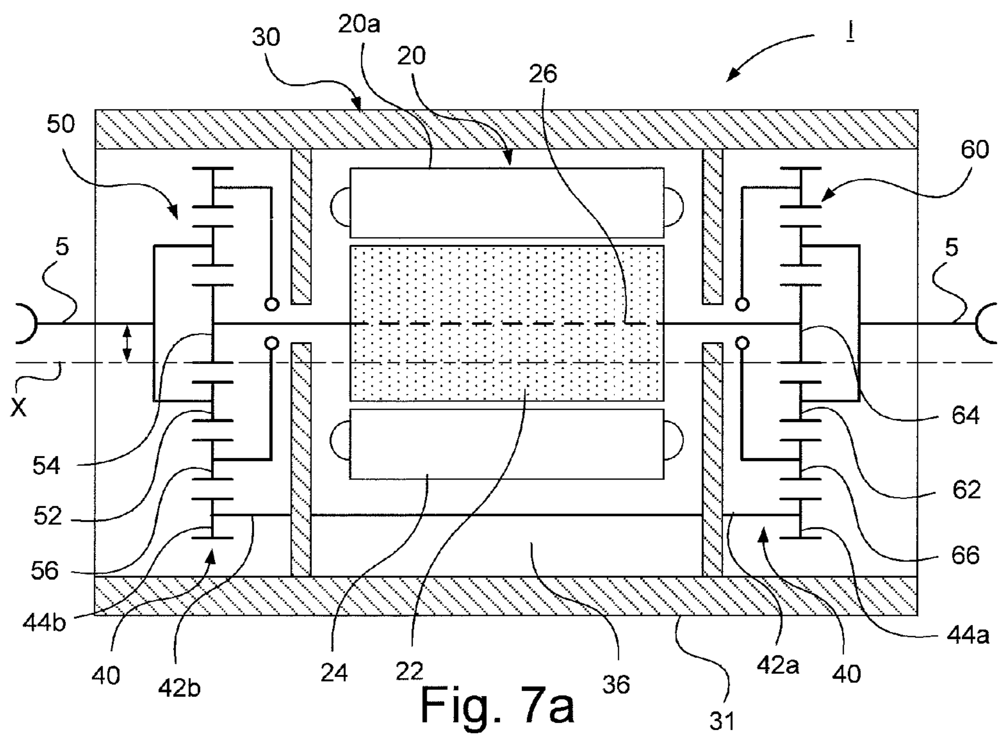
FIG. 7*a* schematically shows an axial cross sectional view of the electrical drive arrangement I of FIG. 3.

As shown in FIG. 4 and FIG. 7*a*, the electrical drive arrangement I comprises a housing 30 and an electric motor 20 accommodated in the housing 30 arranged to drive a drive shaft 26. In an embodiment, said output shafts 5 are arranged substantially coaxially with said electric motor 20, i.e. aligned with the drive shaft 26 of the electric motor. This results in efficient operation of the vehicle 1. In an alternative embodiment, said drive shaft member 5 arranged radially displaced relative to said electric motor 20, where, in a variant, said output shafts 5 are radially displaced relative to the electric motor 20 such that the ground engaging means 7*a*, 7*b* are displaced forward in the longitudinal extension of the vehicle such that, among other things, overcoming of obstacles is improved.

Further, the electrical drive arrangement I comprises a pendulum suspension 70 for suspending the electrical drive arrangement I.

The pendulum suspension 70 comprises a fastening configuration fixedly connected to the vehicle 1 and a pendulum attachment 76 fixedly connected to an envelope surface 31 of the housing 30 and pivotally journaled relative to said fastening configuration 72 by means of a bearing configuration 82. Hence, the electrical drive arrangement I is rotatable relative to the body 2 of the vehicle.

In a variant, the electrical drive arrangement I is intended to drive heavy vehicles, such as work vehicles.

Figure 2:
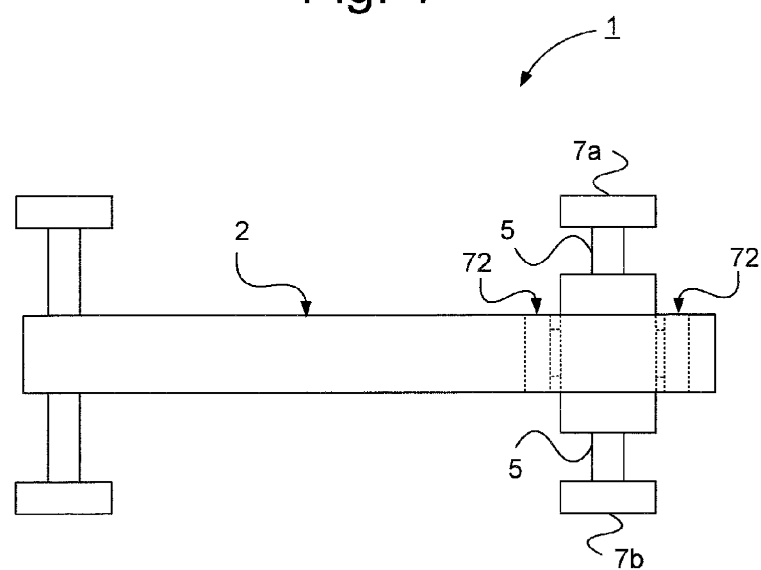
FIG. 2 schematically illustrates a plan view of a motor vehicle with the electrical drive arrangement I of FIG. 1 according to an embodiment of the present invention.

FIG. 2 schematically illustrates a plan view of a motor vehicle with the electrical drive arrangement I of FIG. 1 according to an embodiment of the present invention.

The electrical drive shaft arrangement, that here constitutes the rear driving shaft, is pendulum suspended while the front shaft is rigidly fastened in the frame of the vehicle. This improves the manoeuvrability of the vehicle.

Figure 3:
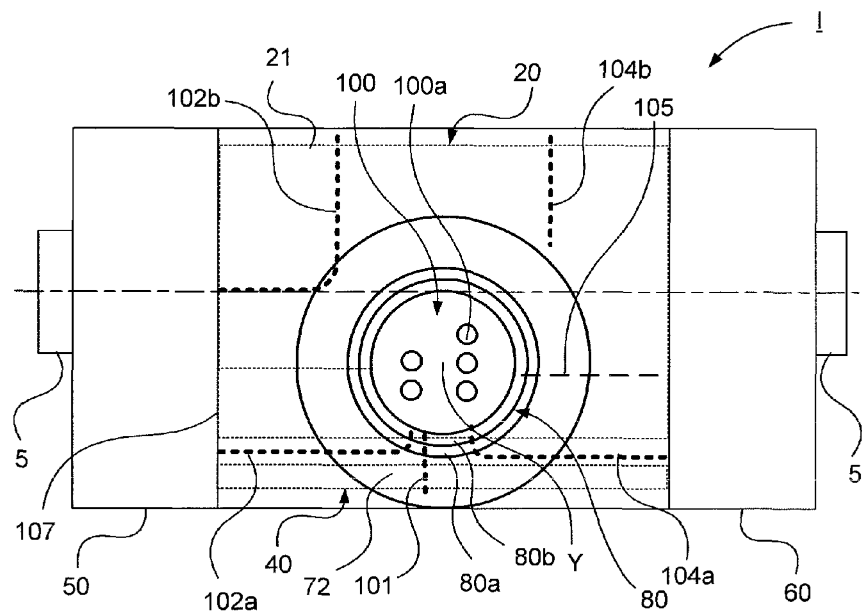
FIG. 3 schematically illustrates a front view of an electrical drive arrangement I according to an embodiment of the present invention.
Figure 5:
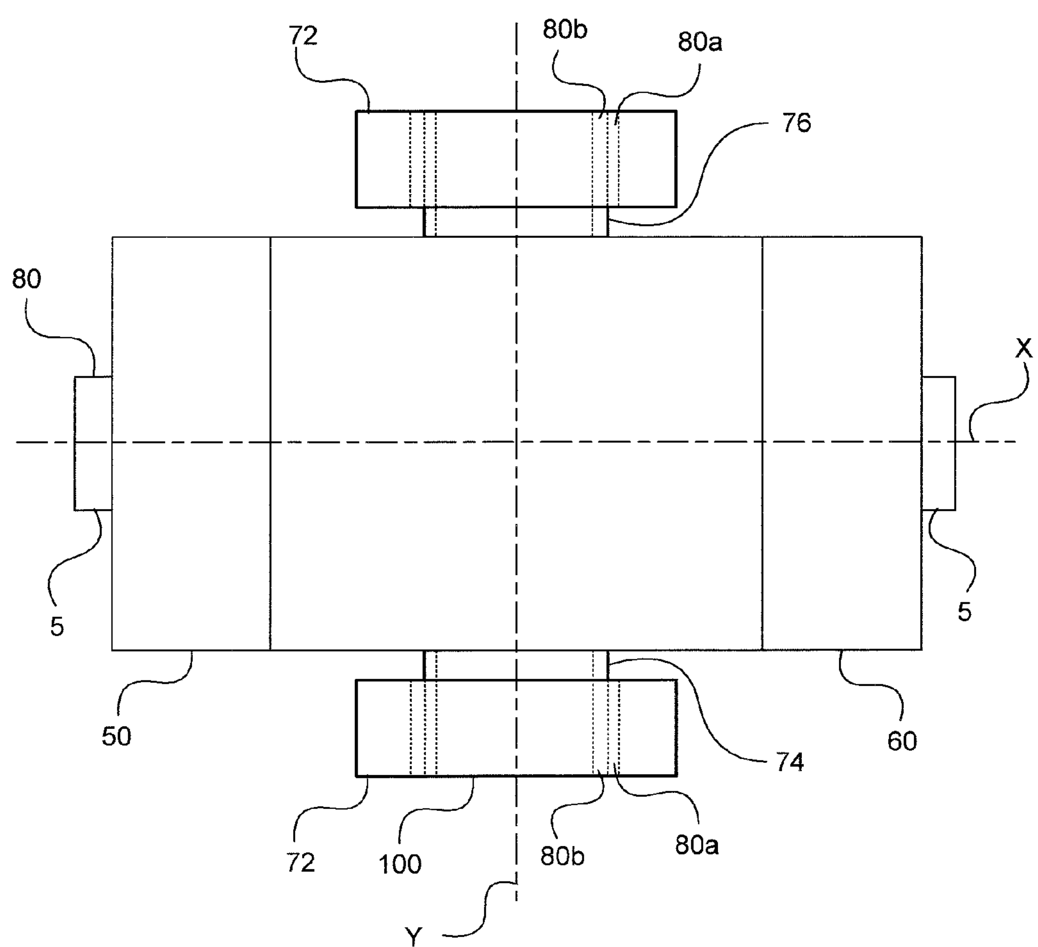
FIG. 5 schematically illustrates a plan view of the electrical drive arrangement I of FIG. 3.

FIG. 3 schematically illustrates a front view of an electrical drive arrangement I according to an embodiment of the present invention, for instance an electrical drive arrangement I according to FIGS. 1 and 2, FIG. 4 a radial cross sectional view of the electrical drive arrangement I of the FIG. 3 and FIG. 5 a plan view of the electrical drive arrangement I of the FIG. 3.

The electrical drive arrangement I for driving a motor vehicle 1 comprises an electric motor 20 as well as a drive shaft 26 driven by means of the electric motor. The electric motor 20 has a substantially circular cylindrical shape. The electric motor 20 has an envelope surface 21. The electrical drive arrangement I further comprises a housing 30 in which the electric motor is accommodated. The housing has an envelope surface 31 and a substantially annular cross section. The horizontal direction of the envelope surface 31 of said housing 30 and hereby said drive shaft 26 are arranged to run substantially transverse to the longitudinal direction of said vehicle as shown in FIG. 1 and FIG. 2. Said housing 30 is axially, i.e. transverse to the longitudinal direction of the vehicle, arranged substantially centrally of the vehicle and said output shafts 5.

The electric motor 20 has a stator 22 and a rotor 24 arranged to rotate the drive shaft 26. Said drive shaft is arranged for driving said two output shafts 5 for driving the ground engaging means, preferably via suitable transmission configurations 50, 60. Said output shafts 5 are arranged to run substantially transversely to the longitudinal direction of said vehicle.

According to the embodiment illustrated in FIG. 3, the electrical drive arrangement I comprises transmission configurations 50, 60 arranged on both sides of the electric motor 20.

The electrical drive arrangement I further comprises, as shown in FIGS. 3 and 4, a differential device 40 superposed arranged and connected to said transmission configurations 50, 60 for accomplishing of differential function.

The electrical drive arrangement I further comprises a pendulum suspension 70 for suspending the electrical drive arrangement I.

The pendulum suspension 70 comprises a fastening configuration 72 fixedly connected to the vehicle and a pendulum attachment 74, 76, fixedly connected to the envelope surface of the housing and pivotally journaled by means of a bearing configuration 80 relative to said fastening configuration 72, comprising a front pendulum attachment 74 and a rear pendulum attachment 76. Hence, the electrical drive arrangement I is rotatable relative to the body 2 of the vehicle.

Said fastening configuration 72 is arranged for suspension of said front and rear pendulum attachment 74, 76.

Said bearing configuration 80, 82 comprises slide bearing 80, 82. Said slide bearing comprises an outer bearing part 80*a*, 80*b* fixedly connected to said fastening configuration 72 and an inner bearing part 80*b*, 82*b* fixedly connected to said pendulum attachment 74, 76 and slidable internally and relative to said outer bearing part 80*a*, 80*b*. Said outer and inner bearing parts 80*a*, 80*b*, 80*b*, 82*b* constitute the bearing races for said pendulum suspension 70.

One of said front and rear pendulum attachments 74, 76, here the front pendulum attachment 74, is connected to a connection unit 100 attached at the envelope surface 31 of said housing 30 for the medium supply of the electric motor 20 and transmission configuration 50, 60. Said medium supply is intended to take place via an opening in the envelope surface 31 of said housing 30.

Said connection unit 100 is connected to said pendulum attachment 70 inside the inner bearing part 80*b* of said slide bearing 80. Said medium supply comprises energy supply by means of power electronics as well as coolant and lubricant supply. Said connection unit 100 comprises connection interface(s) 100*a* for connecting cabling for said power electronics and cabling for said coolant and lubricant supply. An embodiment of said connection interface(s) is described in more detail with reference to FIGS. 6*a* and 6*b*.

The envelope surface 31 of said housing 30 has an uppermost portion 30*a* and a lowermost portion 30*b*. Said pendulum attachment 74 is arranged between the uppermost and lowermost portions 30*a*, 30*b* of the envelope surface 31 of the housing 30. Said pendulum attachment 74 is axially arranged substantially adjacent to a central portion of the envelope surface 31 of said housing 30. Said pendulum attachment is circumferentially of the envelope surface 31 of the housing 30 located adjacent to a horizontal centre plane of the envelope surface 31 of the housing 30.

Hereby, the front pendulum attachment 74 is arranged on the front side of the envelope surface 31 of said housing 30 between the uppermost and lowermost portions of the envelope surface 31 of said housing 30, axially arranged substantially adjacent to a central portion of the envelope surface 31 of said housing 30, and circumferentially of the envelope surface 31 of the housing 30 located adjacent to a horizontal centre plane of the envelope surface 31 of the housing 30.

Correspondingly, the rear pendulum attachment 76 is arranged on the rear side of the envelope surface 31 of said housing 30 between the uppermost and lowermost portions 30*a*, 30*b* of the envelope surface 31 of said housing 30, axially arranged substantially adjacent to a central portion of the envelope surface 31 of said housing 30, and circumferentially of the envelope surface 31 of the housing 30, located adjacent to a horizontal centre plane of the envelope surface 31 of the housing 30. Hence, the rear pendulum attachment 76 is arranged at the envelope surface 31 of the housing 30 substantially opposed to and aligned with the front pendulum attachment 74 such that an imaginary axis Y between the front pendulum attachment and the rear pendulum attachment, i.e. the axis Y about which the pendulum suspended electrical drive arrangement I is pivotable relative to the frame/chassis of the vehicle, runs substantially in the longitudinal extension.

Hereby, said connection unit 100 is arranged on the front side of the envelope surface 31 of said housing 30 between the uppermost and lowermost portions 30*a*, 30*b* of the envelope surface 31 of said housing 30, axially arranged substantially adjacent to a central portion of the envelope surface 31 of said housing 30, and circumferentially of the envelope surface 31 of the housing 30 located adjacent to a horizontal centre plane of the envelope surface 31 of the housing 30.

By arranging the connection unit 100 between the uppermost and lowermost portions 30*a*, 30*b* of the envelope surface 31, the ground clearance of the vehicle is not affected by the connection unit 100 nor the height of the vehicle. Further, in a variant, the connection unit 100 is arranged adjacent the envelope surface 31 of the housing 30 such that splashes, in the form of, for instance, stones, gravel, mud and/or water ripped from ground engaging means connected to other drive shafts such as wheels, are not ending up on the connection unit 100.

Said bearing configuration 80, 82 comprises a front slide bearing 80 having an outer bearing part 80*a* fixedly connected to said fastening configuration 72 and an inner bearing part 80*b* fixedly connected to said front pendulum attachment 74 and slidable internally and relative to said outer bearing part 80*a*.

Said bearing configuration 80, 82 comprises a rear slide bearing 82 having an outer bearing part 82*a* fixedly connected to said fastening configuration 72 and an inner bearing part 82*b* fixedly connected to said rear pendulum attachment 76 and slidable internally and relative to said outer bearing part 82*a*.

The fastening configuration 72 comprises a front fastening portion 72*a* and a rear fastening portion 72*b*.

The front fastening portion 72*a* is arranged in front of the housing 30 and the rear fastening portion 72*b* is arranged behind the housing 30. The front fastening portion 72*a* is at an end region fixedly connected to the body 2/chassis 2/frame 2 of the vehicle and at an opposed end region fixedly connected to the outer bearing part 80*a* of the front slide bearing 80.

The rear fastening portion 72*b* is at an end region fixedly connected to the body 2/chassis 2/frame 2 of the vehicle and at an opposed end region fixedly connected to the outer bearing part 82*a* of the rear slide bearing 82.

As shown as an example in FIG. 3, said medium supply comprises electrical energy supply as well as coolant and lubricant supply. The connection unit 100 is configured for connection of cabling 105 for electric energy supply as well as lines 101, 102*a*, 102*b*, 104*a*, 104*b* for coolant and lubricant. Hence, said medium supply is arranged to take place via the connection unit 100 that is arranged adjacent to the envelope surface of the housing inside the inner portion of the bearing configuration.

The connection unit 100 comprises connection interface(s) for cabling for said electrical energy supply.

The connection unit 100 comprises connection interface(s) for connection of line configuration for pumping, by means of a not shown pumping unit, coolant and lubricant for coolant and lubricant supply of the transmission configuration 50, 60 and the electric motor. The line configuration comprises an uptake line 101 for taking up oil from the oil sump for pumping via heat exchangers returning via the connection unit 100 for supplying the electric motor 20 and the transmission configurations 50, 60.

The connection unit 100 comprises connection interface(s) for said coolant and lubrication lines 101, 102*a*, 102*b*, 104*a*, 104*b* intended for transportation of coolant and lubricant for cooling and lubrication of the electric motor 20 and the transmission configurations 50, 60. Said cooling and lubrication lines are arranged to be led via said transmission configurations 50, 60 for lubrication of gears of the transmission configuration by means of the lubricant, and about the envelope 21 of the electric motor 20 for cooling the electric motor 20 by means of the coolant, where, in an embodiment, the lubricant and the coolant are constituted by oil from the same source in the form of the oil sump O.

An axially running space 36 under the envelope surface of the electric motor 20 is utilized as oil sump O. In this embodiment, the volume becomes available by that the electric motor 20 is eccentrically arranged relative to the housing 30. The space 36 provides room for the shaft configuration 42*a*, 42*b* of the differential device described with reference to FIGS. 7*a* and 7*b*, and consequently to a differential brake/torque-vectoring not shown.

Figure 6A:
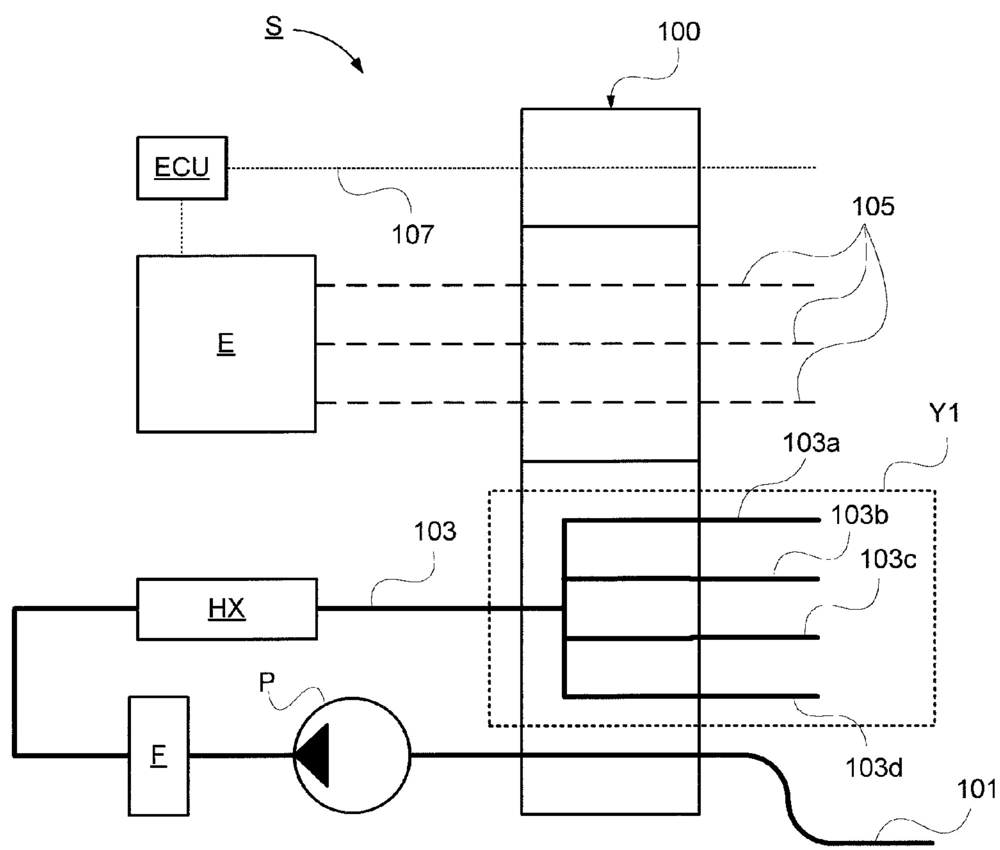
FIG. 6*a* schematically illustrates a system for supply via a supply unit of a drive unit of the electrical drive arrangement I according to an embodiment of the present invention.

FIG. 6*a* schematically illustrates a system S for supply of supply means via a connection unit of the electrical drive arrangement I according to an embodiment of the present invention.

The system comprises said connection unit 100. The system further comprises a pump unit P arranged to, in a line configuration, pump coolant and lubricant, in a variant oil, from a space at the bottom of the housing of the electrical drive arrangement I, according to the present invention, by an uptake line 101 via said connection unit 100. The system S further comprises a filter member F arranged downstream of the pump unit P and configured to filter coolant and lubricant pumped from the space. The system S further comprises a heat exchanger HX arranged downstream of the pump unit P and configured to cool heated coolant and lubricant.

The line configuration comprises an inlet line 103, arranged downstream of the heat exchanger HX, which is connected to the connection unit 100 for supply of coolant and lubricant to the transmission configuration and the electric motor. Said inlet line 103 is connected to the connection unit 100 branched into a set of supply lines 103*a*, 103*b*, 103*c*, 103*d* for enabling priority of supply of the transmission configuration and the electric motor.

In an embodiment, the connection unit 100 comprises not shown overflow valves that are arranged to open based on a predetermined pressure. Hereby, the priority of supply is arranged to take place such that the transmission configurations, in a variant planetary gears arranged on either side of the electric motor, as well as the differential configuration, first are provided with coolant and lubricant via a first supply line 103*a* of the set of supply lines 103*a*, 103*b*, 103*c*, 103*d*, and then winding-heads of the stator winding of the electric motor are provided with coolant and lubricant via a second supply line 103*b*, whereby then a third supply line 103*c* is activated for providing the electric motor rotor with coolant and lubricant, and then the envelope of the electric motor is provided with coolant and lubricant, as well as also bearings. This for instance if the performance of the pump unit P is impaired, wherein the accessibility of the vehicle is ensured in that the risk of failed transmission configurations is avoided.

Hence, in a variant, cooled oil is intended to by high pressure be led in the inlet line 103 into the connection unit 100, branched into the set supply lines 103*a*, 103*b*, 103*c*, 103*d* by prioritizing for instance as above. Oil heated by the electric motor and the transmission configuration is then pumped up from the oil sump in the bottom of the housing and is led via the connection unit 100 and via the pump unit P through the filter F and via the heat exchanger HX for cooling the oil and then returning through the inlet line for supplying the transmission configuration and the electric motor.

The system S further comprises power electronics E arranged to electrically energy supply the electric motor. Said power electronics E is connected to the electric motor via the cabling 105 in the form of three-phase line, which cabling is connected to the electric motor via the connection unit 100.

In an embodiment, the system also comprises an electronic control unit ECU. The electronic control unit ECU is arranged to receive signals from a signal line configuration 107 via the connection unit 100. The electronic control unit is arranged to receive signals from not shown sensor means arranged in connection with electrical drive unit of the electrical drive arrangement I according to the present invention, where said sensor means may comprise flow sensor(s) for determining the flow rate of the coolant and lubricant, level sensor(s) for determining coolant and lubricant level of the oil sump, pressure sensor(s) for determining the pressure of the coolant and lubricant, temperature sensor(s) for determining the temperature of the electric motor, temperature sensor(s) for determining the temperature of the coolant and a lubricant such as oil, position sensor(s) such as a resolver/encoder for determining the position of the rotor of the electric motor, rotation sensor(s) for determining the rotation speed of the rotor, particle measurement sensor(s) for determining the amount of particles of the coolant and lubricant such as oil to determine if the amount of particles of the coolant and lubricant has become high which may indicate wear of for example cogwheels, wherein the electronic control unit ECU is arranged to receive signals from said sensor means representing the flow data, the level data, the pressure data and the temperature data.

The electronic control unit ECU is further connected to said power electronics E. The electronic control unit ECU is arranged to transmit signal to the power electronics representing controlling of the electric motor based on information from the sensor means concerning for instance the rotor position as well as the temperature of the electric motor.

Figure 6B:
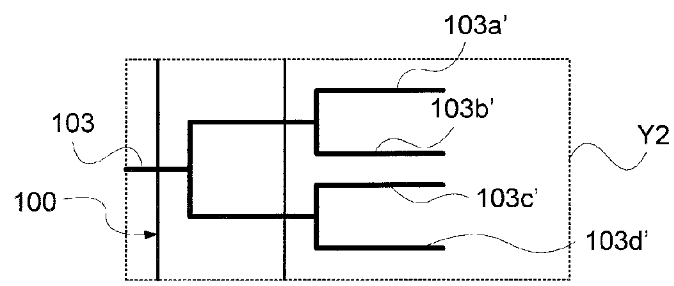
FIG. 6*b* schematically illustrates a part of the system according to an alternative variant.

In FIG. 6*a*, the branching of the supply line 103 takes place in a branching configuration Y1 in the connection unit 100. The branching of the inlet line 103 may take place by any suitable branching configuration. FIG. 6*b* schematically shows a branching configuration Y2 where a sub branching of the inlet line 103 takes place in the connection unit 100, here to two lines, wherein these lines then are branched inside/downstream of the connection unit 100 in respective two supply lines 103*a*', 103*b*', and 103*c*', 103*d*'.

Figure 7B:
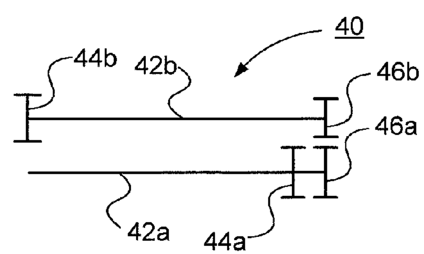
FIG. 7*b* schematically shows a top view of a differential device of the electrical drive arrangement I of FIG. 7*a*.

FIG. 7*a* schematically shows an axial cross section view of an electrical drive arrangement, where the electrical drive arrangement I illustrated in FIGS. 1-5 in a variant is designed according to the electrical drive arrangement I of FIG. 7*a*. FIG. 7*b* illustrates a top view of a differential device 40 of the electrical drive arrangement I in FIG. 7*a*.

The electrical drive arrangement I comprises a pendulum suspension, not shown in FIG. 7*a*, according to the pendulum suspension in FIGS. 1-5*a*. Hence, the electrical drive arrangement I is intended to be pendulum suspended. Hence, the electrical drive arrangement I comprises an electric motor 20 and a housing 30 in which the electric motor 20 is accommodated. The electrical drive arrangement I is arranged to propel a motor vehicle. The housing 30 has an envelope surface 31 and a substantially annular cross section wherein the horizontal direction of the envelope surface 31 of said housing and hereby said drive shaft 26 are arranged to run substantially transverse to the longitudinal direction of said vehicle.

The electric motor 20 comprises a rotor 22 and a stator 24, where said rotor 22 is connected to a drive shaft 26 or rotor shaft 26 and is arranged to rotate said drive shaft 26. The housing 30 has an envelope surface 31 and a substantially annular cross section wherein the horizontal direction of the envelope surface 31 of said housing and hereby said drive shaft 26 are arranged to run substantially transverse to the longitudinal direction of said vehicle.

The drive shaft 26 is arranged to run concentrically relative to the rotor 22, wherein the rotor 22 is arranged to surround the drive shaft 26. The stator 24 is arranged to surround the rotor 22, wherein the rotor shaft and hence the rotor 22 are arranged concentrically relative to the stator 24. The drive shaft 26 is arranged to run substantially horizontally. The drive shaft 26 is intended to be connected to and drive ground engaging means such as drive wheels or drive tracks. Hence, the electrical drive arrangement I is arranged to drive the ground engaging means such as drive wheels or drive tracks for the propulsion of the motor vehicle.

Hence, in this embodiment, the drive shaft 26 runs concentrically relative to the imaginary centre axis of the electric motor 20. Hereby, a desired space 36 between the electric motor and said housing is formed. Said desired space 36 has a valley-like configuration.

The housing 30 has a substantially annular cross section with an imaginary centre axis X. In this embodiment, the housing 30 has a substantially circular cross section. The electric motor 20 is eccentrically displaced arranged in the housing 30 such that the drive shaft 26 of the electric motor 20 runs parallel with and spaced from the centre axis X of the housing 30 to form said desired space 36. Hence, the housing 30 is intended to be arranged substantially horizontally such that the imaginary centre axis X extends substantially horizontally.

In this embodiment, the electric motor 20 is displaced substantially radially upwards in the substantially circular cylindrical housing 30. The housing 30 constitutes a middle portion of a supporting structure in the electrical drive arrangement I. In a variant, the displacement of the drive shaft 26/the imaginary centre axis 26 of the electric motor 20 relative to the imaginary centre axis of the housing 30 is 20-100 mm, in a variant about 45 mm. Said displacement can be within any suitable range comprising greater ranges than the above mentioned. Hence, said desired space runs axially in the lower region of the housing 30.

The centimetres gained under the electric motor 20 because of the eccentric location of the electric motor 20 relative to the drive shaft 26 are utilized for location of differential shaft configuration 42*a*, 42*b* of the differential device 40 and the oil sump O. Further, it is facilitated to via the connection unit in a smooth manner take out the cabling from the middle of the housing 30, which is illustrated in among others FIGS. 3 and 4 and is explained in more detail below.

The electrical drive arrangement I comprises an output shaft 12 connected to the drive shaft 26. In this embodiment, the output shaft 12 is aligned with drive shaft 26. In this embodiment, the output shaft 12 extends through said drive shaft 26.

In this embodiment, the electrical drive arrangement I comprises differential means arranged in the housing 30. Said differential means comprises a first transmission configuration 50 in the form of a first planetary gear configuration 50 and a second transmission configuration 60 in the form of a second planetary gear configuration 60, where the electric motor 20 is arranged between said first and second planetary gear configurations 50, 60.

The first planetary gear configuration 50 comprises planetary wheel(s) 52, a sun wheel 54, and a ring wheel 56. The second planetary gear configuration 60 comprises planetary wheel(s) 62, a sun wheel 64, and a ring wheel 66.

The first and second planetary gear configurations 50, 60 are drivingly connected to each other via said output shaft 12. The output shaft 12 is connected to the sun wheel 54, 64 of the respective planetary gear configuration 50, 60.

The differential means comprises the differential device 40 engaged with the ring wheel 56 of the first planetary gear configuration 50 and the ring wheel 66 of the second planetary gear configuration 60 for accomplishing differential function of a motor vehicle.

The differential device 40 comprises a shaft configuration 42*a*, 42*b* which is arranged in the housing 30 between the electric motor and housing wall of the housing 30 in the space 36 that is freed by said displacement of the centre axis 26 of the electric motor 20 relative to the centre axis X of the housing 30.

As shown in FIG. 7*b*, the shaft configuration comprises a first differential shaft 42*a* and a second differential shaft 42*b* which run substantially parallel along each other in the axial longitudinal extension of the housing in the space 36. The differential device comprises differential drives 44*a*, 44*b*, 46*a*, 46*b*, wherein the drive 44*a* on the first differential shaft 42*a* is in meshing engagement with the ring wheel 56 and the drive 44*b* on the first differential shaft 42*b* is in meshing engagement with the ring wheel 66.

The differential device 40 is arranged to shift up the output shaft 5 on one side while the other side is shifted down which is accomplished by that the ring wheels 56, 66 are allowed to rotate opposed to each other by means of the drives 46*a*, 46*b*.

The electric motor 20 of the electrical drive arrangement I is axially aligned with the output shaft 5 and the shaft configuration 42 of the differential device 40 is arranged to run along the envelope surface of the electric motor 20 in the space 36, in the housing 30, freed by the displacement of the centre axis of the electric motor 20 relative to the centre axis of the housing 30.

By using a cylindrical housing 30 having a circular cross section a flexurally rigid housing 30 is obtained which is easy and cheap to manufacture. In an embodiment, construction member for the housing 30 is constituted by a pipe having circular cross section which is optimal for load carrying. By arranging the electric motor 20 eccentrically in a similar horizontally arranged housing 30, volume uppermost in the housing 30 is utilized, i.e. the electric motor is arranged such that its upper envelope surface runs axially along the inner upper surface of the housing 30, while the shaft configuration of the differential device is arranged under the electric motor 20 in the space 36 which is freed, i.e. the shaft configuration is arranged such that it runs axially in space 36 along the inner bottom surface of the housing 30, wherein a compact construction is obtained, while a circular cylindrical pipe is utilized having the above mentioned advantages.

Hence, in this embodiment, the electric motor 20 is located eccentrically in the circular cylindrical housing 30 horizontally arranged in a vehicle, i.e. the rotation centre of the drive shaft 26 is radially displaced relative to the imaginary centre axis X of the circular cylindrical housing 30, wherein thus room is provided to the shaft configuration 42*a*, 42*b* of the differential device 40 in the housing 30 in the axially running space 36 below the electric motor 20. The volume that becomes available when the electric motor 20 is displaced is utilized as oil sump O and provides as mentioned room for the shaft configuration 42*a*, 42*b* of the differential device 40 as well as for a not shown differential break/torque-vectoring. Further, the freed space 36 enables gathering of connections for lubricant, coolant, power feeding and sensors, etc. and connecting these to the connection unit of the present invention.

The fact that the output shaft extends through said drive shaft provides a motor in the shaft solution with the output shaft 5 via the planetary gear configuration 50, 60 on the respective side of the electric motor 20. A motor in the shaft solution requires no propeller shafts but all power transmission takes place via cable.

The electrical drive arrangement I of the present invention is intended primarily for medium heavy and heavy special vehicles. Hereby, the electric motor 20 is horizontally located in the vehicle wherein the envelope 21 of the electric motor 20 and the envelope 31 of housing 30 run in the width direction of the vehicle. The electric motor 20 is further eccentrically located relative to the circular cylindrical housing 30 arranged horizontally in the vehicle, whereby also coaxiality is retained between the drive shaft and the output shaft and hence the drive wheel.

Above, embodiments of the electrical drive arrangement I have been shown and described where the housing has a substantially circular cylindrical cross section. The housing of the electrical drive arrangement I may have any suitable annular cross section. In an alternative embodiment, the housing has a substantially elliptical cross section. In an alternative embodiment, the housing has a substantially ovoid cross section. In an alternative embodiment, the housing has a substantially oblong cross section with parallel sides and semi-circular ends.

Above, an electrical drive arrangement I has been described where the electric motor is eccentrically located in the housing. In an alternative embodiment, the electrical drive arrangement I has a housing with a substantially circular cross section having a centre axis, wherein the electric motor is concentrically arranged in the housing such that the drive shaft/the centre axis of the electric motor is aligned with the centre axis of the housing.

In FIG. 1, an electrical drive arrangement I is shown where the pendulum attachment of the pendulum suspension and hereby the connection unit, connected to said pendulum attachment inside the inner bearing part of said slide bearing, are arranged such that imaginary pivot axis of the pendulum suspension runs in the horizontal centre plane of the housing transverse to the axial direction of the housing. This results in a stable and balanced pendulum suspension of the electrical drive arrangement I.

In FIGS. 3 and 4, an electrical drive arrangement I is shown where the pendulum attachment of the pendulum suspension and hereby the connection unit, connected to said pendulum attachment inside the inner bearing part of said slide bearing, are arranged such that imaginary pivot axis of the pendulum suspension runs in a lower region between the horizontal centre plane of the housing and the lowermost portion of the envelope surface of the housing transverse to the axial direction of the housing. Hereby, leading out cabling from the electric motor and cooling and lubrication lines from the housing is facilitated.

Said inner bearing part of the front and rear slide bearings may be fastened to the envelope surface of the housing in any suitable manner by means of any suitable fastening members such as bolt connections, rivet connections or similar. In a variant, said inner bearing part of the front and rear slide bearings are fastened directly at the envelope surface 31 of the housing 30. In a variant, said inner bearing part of the front and rear slide bearings are fastened about an annular portion of the housing 30 projecting substantially perpendicular and horizontal from the envelope surface 31 of the housing 30. In a variant, said connection unit is connected internally at such a hollow annular projecting portion.

In a variant, said bearing configuration comprises only one of the front and rear slide bearings, in a variant only the front slide bearing. Hence, in a variant not shown, the pendulum suspension comprises only one slide bearing where, in a variant, the slide bearing constitutes a front slide bearing.

The above description of the preferred embodiments of the present invention has been provided for illustrative and descriptive purposes. It is not intended to be exhaustive or to limit the invention to the variants described. Obviously, many modifications and variations may be apparent to the skilled person. The embodiments were chosen and described to best explain the principles of the invention and its practical applications, thereby enabling a skilled person to understand the invention for various embodiments and with the various modifications suitable for the intended use.

The invention claimed is:

1. An electrical drive arrangement for driving a motor vehicle comprising:

an electric motor, a drive shaft driven by the electric motor, a housing in which the electric motor is accommodated, which housing has an envelope surface and a substantially annular cross section, wherein the horizontal direction of the envelope surface of said housing and hereby said drive shaft are arranged to run substantially transverse to the longitudinal direction of said vehicle, a pendulum suspension for suspension of the electrical drive arrangement, where the pendulum suspension comprises a fastening configuration fixedly connected to the vehicle and at least one pendulum attachment fixedly connected to the envelope surface of the housing and pivotally journaled relative to said fastening configuration by a bearing configuration, wherein said pendulum attachment is connected to a connection unit, attached at the envelope surface of said housing, for medium supply of the electric motor, and wherein said medium supply is configured to take place via an opening in the envelope surface of said housing.

2. The electrical drive arrangement of claim 1, wherein the electric motor has a stator and a rotor arranged to rotate the drive shaft.

3. The electrical drive arrangement of claim 1, wherein said drive shaft is arranged for driving two output shafts for driving ground engaging members, preferably via suitable transmission configurations and wherein said output shafts are arranged to run substantially transverse to the longitudinal direction of said vehicle.

4. The electrical drive arrangement of claim 1, wherein said fastening configuration is arranged for suspension of a front and a rear pendulum attachment.

5. The electrical drive arrangement of claim 1, wherein said bearing configuration comprises slide bearing.

6. The electrical drive arrangement of claim 5, wherein said slide bearing comprises an outer bearing part fixedly connected to said fastening configuration and an inner bearing part fixedly connected to said pendulum attachment and internally and slidable relative to said outer bearing part.

7. The electrical drive arrangement of claim 6, wherein said connection unit is connected to said pendulum attachment inside the inner bearing part of said slide bearing.

8. The electrical drive arrangement of claim 1, wherein said pendulum attachment is arranged between uppermost and lowermost portions of the envelope surface of said housing.

9. The electrical drive arrangement of claim 1, wherein said pendulum attachment axially is arranged substantially adjacent to a central portion of the envelope surface of said housing.

10. The electrical drive arrangement of claim 1, wherein the pendulum attachment circumferentially of the envelope surface of the housing is located adjacent to a horizontal centre plane of the envelope surface of the housing.

11. The electrical drive arrangement of claim 1, wherein said medium supply comprises energy supply by power electronics and/or coolant and lubricant supply.

12. The electrical drive arrangement of claim 1, wherein an oil sump is arranged at the bottom of the housing in a desired space formed between the electric motor and said housing under a lowermost portion of the envelope surface of the electric motor, for said coolant and lubricant supply.

13. The electrical drive arrangement of claim 12, wherein the electric motor is eccentrically arranged in the housing such that the centre of rotation of the drive shaft of the electric motor runs substantially parallel to and spaced from an imaginary centre axis of the housing to form said desired space.

14. The electrical drive arrangement of claim 12, further comprising a differential device having a shaft configuration arranged in the housing in the desired space between the electric motor and the housing.

15. A motor vehicle comprising the electrical drive arrangement of claim 1.

* * * * *